United States Patent

Morrill

[11] Patent Number: 5,843,346
[45] Date of Patent: Dec. 1, 1998

[54] METHOD OF CAST MOLDING CONTACT LENSES

[75] Inventor: Timothy J. Morrill, Plaistow, N.H.

[73] Assignee: Polymer Technology Corporation, Wilmington, Mass.

[21] Appl. No.: 695,197

[22] Filed: Aug. 1, 1996

Related U.S. Application Data

[63] Continuation of Ser. No. 269,009, Jun. 30, 1994, abandoned.

[51] Int. Cl.⁶ ........................................................ B29D 11/00
[52] U.S. Cl. .............................................. 264/2.5; 425/808
[58] Field of Search ..................... 264/2.5, 219; 425/808

[56] References Cited

U.S. PATENT DOCUMENTS

| | | | |
|---|---|---|---|
| 3,808,178 | 4/1974 | Gaylord. | |
| 4,152,508 | 5/1979 | Ellis | 526/279 |
| 4,284,591 | 8/1981 | Neefe | 264/2.5 |
| 4,686,267 | 8/1987 | Ellis | 526/245 |
| 4,780,515 | 10/1988 | Deichert | 526/245 |
| 5,271,875 | 12/1993 | Appleton | 264/2.3 |

OTHER PUBLICATIONS

"Flow Rates of Thermoplastics by Extrusion–Plastometer," *American Society for Testing and Materials*, Designation D 1238–86, pp. 552–565.

*Primary Examiner*—Mathieu D. Vargot
*Attorney, Agent, or Firm*—John E. Thomas; Denis A. Polyn

[57] ABSTRACT

An improved method for cast molding RGP contact lenses employs mold sections injection molded from a specific class of thermoplastic, polyolefin resins.

5 Claims, 1 Drawing Sheet

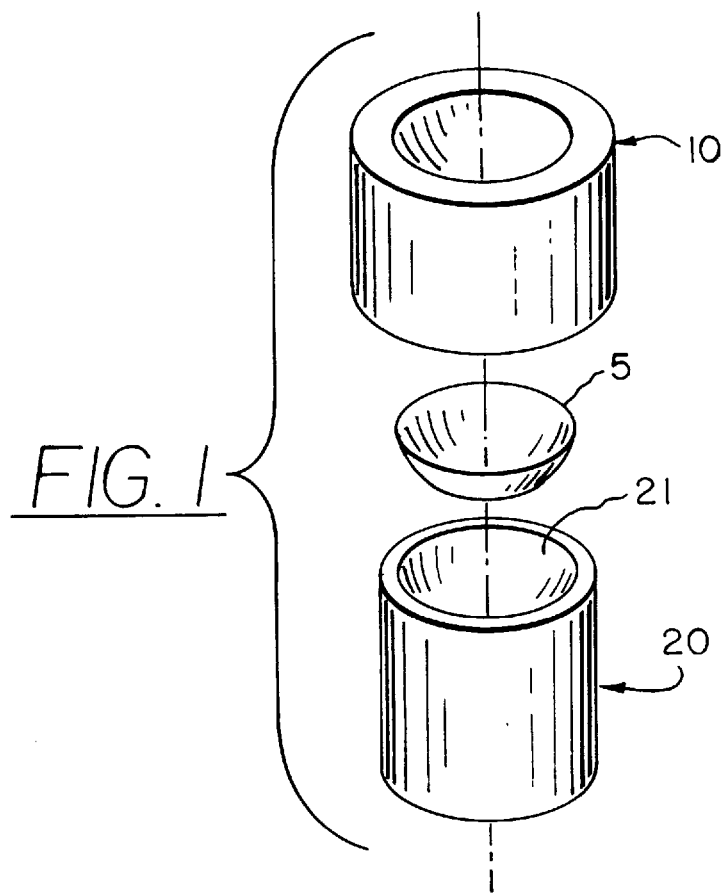
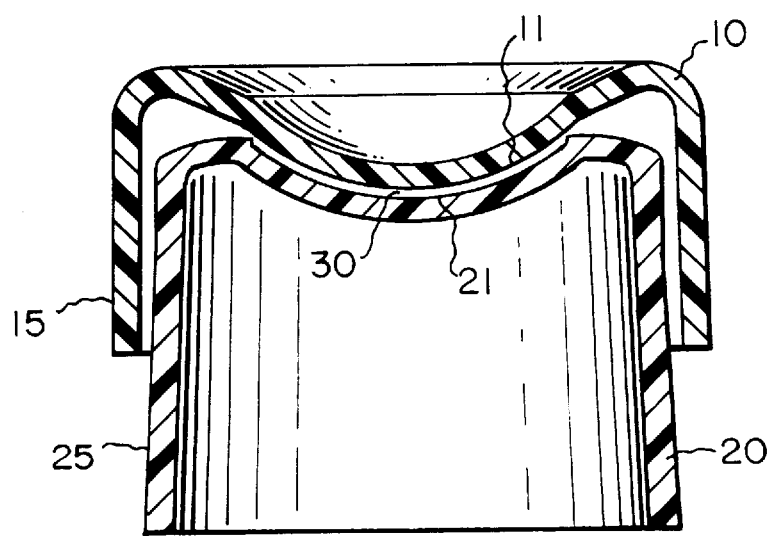

METHOD OF CAST MOLDING CONTACT LENSES

This is a continuation of application Ser. No. 08/269,009 filed on Jun. 30, 1994, now abandoned.

BACKGROUND OF THE INVENTION

The present invention relates to improvements in static cast molding of contact lenses.

A method known, in general, for manufacturing contact lenses is static cast molding. Cast molding of contact lenses involves depositing a curable mixture of polymerizable monomers in a mold cavity formed by two mold sections, curing the monomer mixture, and disassembling the mold assembly and removing the lens. One mold section forms the anterior lens surface (anterior mold section), and the other mold section forms the posterior lens surface (posterior mold section).

Prior to the cast molding of the contact lens, each of the mold sections is formed. Conventional methods involve injection molding the molds sections from a resin in the cavity of an injection molding apparatus. Typically, the mold sections are used only once for casting a lens and then discarded.

Several cast molding methods have been found to offer the potential to reduce production time and cost for the manufacture of soft hydrogel contact lenses, since time-consuming and labor-intensive operations are avoided, such as lathing a contact lens from a button (or lens blank) or a semi-finished button (containing one finished surface).

However, various problems have been encountered in employing cast molding technology for manufacturing rigid, gas permeable (RGP) contact lenses.

The design and surface quality of RGP contact lenses is more critical to achieve proper fitting than for soft contact lenses. In contrast to RGP contact lenses, soft contact lenses are flexible and, to a larger extent, will conform to the shape of the cornea when placed on eye. Standards issued by the American National Standards Institute (ANSI Standards Z80.2-1989) define stricter tolerances (diameter, base curve, center thickness and refractive power) for RGP lenses than for soft contact lenses. It will be appreciated that RGP contact lenses require stricture tolerances in the manufacturing process, and it is more critical that the manufacturing process does not result in deviations in optical lens parameters or surface quality among individual lenses.

SUMMARY OF THE INVENTION

This invention relates to improvements in the static cast molding of contact lenses, wherein a lens-forming mixture is cured in the lens-shaped cavity formed between molding surfaces of first and second mold sections of a mold assembly. The improvement comprises injection molding at least one of the mold sections from a thermoplastic polyolefin resin having a melt flow rate of at least about 21 g/10 min.

It has been found that this class of resins are compatible with conventional contact lens materials, and provides RGP lenses with a higher consistency of optical quality.

BRIEF DESCRIPTION OF THE DRAWINGS

FIG. 1 is a schematic exploded view of a representative mold assembly.

FIG. 2 is a schematic cross-sectional view of an assembled mold assembly.

DESCRIPTION OF PREFERRED EMBODIMENTS

A representative mold assembly 1 for the method of this invention is shown schematically in FIGS. 1 and 2. The mold assembly includes posterior mold 10 having a posterior optical surface 11 (which forms the posterior surface of the molded lens), and anterior mold 20 having an anterior optical surface 21 (which forms the anterior surface of the molded lens).

When the mold sections are assembled, cylindrical shell 25 is received in cylindrical shell 15, and a mold cavity 30 is formed between the two defining surfaces 11, 21 that corresponds to the desired shape of the contact lens 5 molded therein. For casting RGP lenses, surfaces 11, 21 will include a central zone for forming the central optical zone of the lens having a desired vision correction, and curves peripheral to the central zone for forming desired peripheral curves on the lens. Subsequent to assembling the mold sections, the monomer mixture is polymerized, such as by exposure to UV light and/or heat, followed by disassembling the mold assembly and removing the molded lens therefrom. Other processing steps may be included following casting, such as lens inspection, lens sterilization and lens packaging.

The lenses cast molded by the method of this invention include lenses formed of conventional RGP materials. Conventional RGP materials for contact lenses are well known in the art and include silicone acrylate copolymers and fluorosilicon acrylate copolymers. Representative silicone acrylate RGP materials include copolymers of a siloxane (meth)acrylate monomer (such as tris(trimethylsiloxy) silylpropyl methacrylate), a hydrophilic wetting monomer (such N-vinyl pyrrolidone or methacrylic acid), a crosslinking monomer (such as monomers having two terminal (meth) acrylate radicals), and a hardening monomer (such as methyl methacrylate or dimethyl itaconate). Fluorosilicon acrylate RGP materials include a fluorinated comonomer; for example, a fluorinated (meth)acrylate or fluorinated itaconate comonomer is included in place of, or in addition to, the non-fluorinated hardening monomer. Representative RGP materials are disclosed in U.S. Pat. Nos. 4,152,508 (Ellis et al.), 3,808,178 (Gaylord), 4,686,267 (Ellis et al.) and 4,780,515 (Deichert).

According to the invention, at least one of the anterior and posterior mold sections is injection molded from a thermoplastic polyolefin resin having a melt flow rate of at least about 21 g/10 min in an injection molding apparatus. (As used herein, the term "melt flow rate" denotes the industry known standard ASTM D 1238-86. This parameter is usually available from suppliers of commercial resins.) According to preferred embodiments, both mold sections are injection molded from this class of resins.

The mold sections may be injection molded from the thermoplastic polyolefin resin by methods which are otherwise known in the art. The tools for the injection molding are typically made from brass, stainless steel or nickel or some combination thereof. A preferred material for use with this invention is nickel-plated brass. A desired surface is machined and polished on the tools to achieve precision surface quality so that no surface imperfections are transferred to the mold section being injection molded therefrom.

Representative commercial materials having the defined melt flow rate include the following wherein melt flow rate (MFR) is indicated in g/10 min: the polypropylene resins available under the trademark PRO-FAX SR-011 and PRO-FAX SB-751 (Himont, Incorporated, Wilmington, Del., USA), MFR 21 and 30, respectively; the polypropylene resins available under the trademark ESCORENE PP1434F1 and PP1105F1 (Exxon Chemical Co., Polymers Group, Houston, Tex., USA), MFR 25 and 35, respectively; the polypropylene resin available under the trademark MARLEX HGZ-350 (Phillips 66 Corporation, Houston, Tex., USA), MFR 35; and the polypropylene resin available under the trademark UNIPOL PP 7C12N (Shell Chemical Co., Houston, Tex., USA), MFR 22.

Applicant found that this class of thermoplastic polyolefin resins provides mold sections having higher optical quality than mold sections injection molded from other thermoplastic polyolefin resins (i.e., thermoplastic polyolefin resins having a melt flow rate of 20 g/10 min or lower). In turn, this ensures that the contact lenses, cast molded in the mold sections, have higher optical quality and that there is greater consistency among individual lenses. In addition, this class of resins exhibits satisfactory chemical compatibility with the monomer mixtures from which the contact lenses are cast, and exhibit relatively low shrinkage after injection molding.

Alternate materials that were investigated include engineering resins. The engineering resins are generally amorphous polymers regarded as offering higher mechanical and physical properties than thermoplastic polyolefin resins. However, while certain engineering resins provided mold sections with good optical quality, these engineering resins did not have sufficient chemical compatibility with the contact lens material. For example, monomer mixtures used to mold RGP lenses would attack and deteriorate the quality of the optical molding surface of mold sections made of such engineering resins, or mold sections formed of the engineering resin would adversely affect the surface properties of contact lenses molded therein. Further, some classes of engineering resins tended to exhibit relatively high shrinkage.

Various resins were injection molded into contact lens mold sections having the configuration shown in FIG. 2, and the casting surfaces of the mold sections were examined with interferogram imaging to evaluate the optical quality of these surfaces. It was found that the quality of the casting surface of the mold sections injection molded from a polyolefin resin having the melt flow rate of at least about 21 g/10 min closely approximated the optical quality of the casting surface of the mold sections injection molded from an amorphous engineering resin. In contrast, significant radius changes and irregularities were observed in the casting surface of the mold sections injection molded from other polyolefin resins having a melt flow rate of 20 g/10 min or lower.

Additionally, RGP contact lenses were cast molded in such contact lens mold sections made from the polyolefin resins having the melt flow rate of at least about 21 g/10 min. It was found that the molded lenses had optical quality comparable to RGP lenses lathe cut by conventional methods, and met the tolerances for RGP contact lenses as provided in the ANSI standards.

Although certain preferred embodiments of the invention have been described, it is understood that the invention is not limited thereto and modifications and variations would be evident to a person of ordinary skill in the art.

I claim:

1. In a method of cast molding a contact lens that comprises curing a lens-forming mixture in a lens-shaped cavity formed between molding surfaces of first and second mold sections of a mold assembly, the improvement wherein at least one of said mold sections is injection molded from a thermoplastic polyolefin resin having a melt flow rate of at least about 21 g/10 min.

2. The method of claim 1, wherein both the first and second mold sections are injection molded from a thermoplastic polyolefin resin having a melt flow rate of at least about 21 g/10 min.

3. The method of claim 2, wherein the resin is a thermoplastic polypropylene resin having a melt flow rate of at least about 21 g/10 min.

4. The method of claim 1, wherein the resin is a thermoplastic polypropylene resin having a melt flow rate of at least about 21 g/10 min.

5. The method of claim 1, wherein the contact lens is formed of a rigid, gas permeable material.

* * * * *